(12) United States Patent
Kondo et al.

(10) Patent No.: US 12,397,651 B2
(45) Date of Patent: Aug. 26, 2025

(54) ELECTRIFIED VEHICLE

(71) Applicant: TOYOTA JIDOSHA KABUSHIKI KAISHA, Toyota (JP)

(72) Inventors: Takayoshi Kondo, Nagoya (JP); Ryoji Sato, Toyohashi (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 0 days.

(21) Appl. No.: 18/433,684

(22) Filed: Feb. 6, 2024

(65) Prior Publication Data

US 2024/0286490 A1  Aug. 29, 2024

(30) Foreign Application Priority Data

Feb. 24, 2023 (JP) ................. 2023-027196

(51) Int. Cl.
| | | |
|---|---|---|
| *B60L 15/00* | (2006.01) | |
| *H02J 7/00* | (2006.01) | |
| *H02P 21/00* | (2016.01) | |
| *H02P 27/08* | (2006.01) | |
| *H02P 29/62* | (2016.01) | |

(52) U.S. Cl.
CPC .......... *B60L 15/007* (2013.01); *H02J 7/0063* (2013.01); *H02J 7/007194* (2020.01); *H02P 21/50* (2016.02); *H02P 27/08* (2013.01); *H02P 29/62* (2016.02); *B60L 2240/12* (2013.01); *B60L 2240/526* (2013.01); *B60L 2240/545* (2013.01)

(58) Field of Classification Search
CPC ............... B60L 15/007; B60L 2240/12; B60L 2240/526; H02P 21/50; H02P 29/62; H02P 27/08; H02J 7/007194
See application file for complete search history.

(56) References Cited

U.S. PATENT DOCUMENTS

| | | | |
|---|---|---|---|
| 2009/0237013 A1* | 9/2009 | Sato ....................... | B60L 15/08 318/400.15 |
| 2013/0076122 A1 | 3/2013 | Ohtomo | |

(Continued)

FOREIGN PATENT DOCUMENTS

| | | |
|---|---|---|
| CN | 112977094 A | 6/2021 |
| JP | 5409737 B2 | 2/2014 |

(Continued)

*Primary Examiner* — Jared Fureman
*Assistant Examiner* — Duc M Pham
(74) *Attorney, Agent, or Firm* — Oliff PLC

(57) ABSTRACT

An electrified vehicle includes a drive device including an alternating current motor and an inverter that drives the alternating current motor, a control device that controls the drive device, and a heat transfer device that transfers heat of the drive device to a heating target. When a predetermined heat requirement condition transferred to the heating target is satisfied, the control device executes loss increase control to control the drive device so that the power loss increases compared to a case where the heat requirement condition is not satisfied. When an index value regarding a rotation speed of the alternating current motor is less than a first threshold, the loss increase control includes first control to make a d-axis current of the alternating current motor larger than a reference d-axis current, which is the d-axis current when the heat requirement condition is not satisfied.

16 Claims, 11 Drawing Sheets

(56) References Cited

U.S. PATENT DOCUMENTS

| | | | |
|---|---|---|---|
| 2018/0162379 A1 | 6/2018 | Mizuno et al. | |
| 2022/0329184 A1 | 10/2022 | Lian et al. | |
| 2023/0137049 A1* | 5/2023 | Hair | H02K 24/00 318/605 |
| 2023/0421090 A1* | 12/2023 | Hair | H02P 29/662 |
| 2024/0042868 A1 | 2/2024 | Lian et al. | |

FOREIGN PATENT DOCUMENTS

| | | |
|---|---|---|
| JP | 2018/098857 A | 6/2018 |
| KR | 20220051256 A | 4/2022 |

* cited by examiner

ELECTRIFIED VEHICLE

CROSS-REFERENCE TO RELATED APPLICATION

This application claims priority to Japanese Patent Application No. 2023-027196 filed on Feb. 24, 2023 incorporated herein by reference in its entirety.

BACKGROUND

1. Technical Field

The present disclosure relates to an electrified vehicle.

2. Description of Related Art

Japanese Unexamined Patent Application Publication No. 2018-098857 discloses an electrified vehicle. This electrified vehicle includes a battery, an inverter, a motor, a circulation circuit, and a control device. The inverter drives the motor. The circulation circuit is configured to circulate cooling water through the battery, motor, and inverter. When there is a heat requirement, the control device generates a pulse width modulation (PWM) signal of a switching element of the inverter such that the total loss of the inverter and motor increases compared to when there is no heat requirement. This increases the amount of heat generated from the inverter and motor, raising the temperature of the cooling water. As a result, a heating target, such as a battery, is heated.

SUMMARY

When an electrified vehicle is traveling at high speed (when the motor is rotating at high speed), even when vibration and operating noise increase when the loss of the motor increases, the vibration and operating noise of the motor are less noticeable due to road noise. As a result, it is less likely that the comfort in the vehicle cabin will be impaired. On the other hand, when the electrified vehicle is traveling at low speed or stopped (when the motor is rotating at low speed or stopped), if the vibration and operating noise increase when the loss of the motor increases, the vibration and operating noise are likely to be noticeable. As a result, the comfort in the vehicle cabin may be impaired.

The present disclosure is capable of solving these problems, and is capable of heating a heating target by utilizing heat from a motor while avoiding a situation in which comfort in a vehicle cabin is impaired.

An aspect of the present disclosure relates to an electrified vehicle including a drive device, a control device, and a heat transfer device. The drive device includes an alternating current motor that generates a driving force used to allow the electrified vehicle to travel, and an inverter that drives the alternating current motor. The control device controls the drive device. The heat transfer device transfers heat generated due to power loss in the drive device to a heating target in the electrified vehicle. When a predetermined heat requirement condition for requesting an increase in the heat transferred to the heating target is satisfied, the control device executes loss increase control to control the drive device so that the power loss increases compared to a case where the heat requirement condition is not satisfied. When an index value regarding a rotation speed of the alternating current motor (M) is less than a first threshold, the loss increase control includes first control to make a d-axis current of the alternating current motor (M) larger than a reference d-axis current, the reference d-axis current being the d-axis current when the heat requirement condition is not satisfied.

With the configuration, when the heat requirement condition is satisfied (when loss increase control is executed) and the index value is less than the first threshold (when the electrified vehicle is traveling at low speed or stopped), the d-axis current becomes larger than the reference d-axis current. As a result, the torque of the alternating current motor is less likely to fluctuate, making it possible to avoid a situation where the comfort in a vehicle cabin is impaired. Further, the heat transferred from the drive device to the heating target through the heat transfer device increases during the first control due to an increase in power loss. Thereby, the heating target can be heated effectively. As a result of the above, with the configuration, it is possible to heat the heating target by utilizing the heat from the alternating motor while avoiding a situation in which the comfort in the vehicle is impaired.

In the electrified vehicle according to the aspect, the first control may include controlling the inverter so as to increase a current amplitude of the alternating current motor and delay a current advance angle of the alternating current motor compared to before the heat requirement condition is satisfied.

In the electrified vehicle according to the aspect, when the heat requirement condition is not satisfied, the control device may set the current advance angle so as to maximize torque of the alternating current motor for the same current amplitude.

With the configuration, when loss increase control is not required, torque can be efficiently generated while reducing power loss in the alternating current motor.

In the electrified vehicle according to the aspect, the first control may include controlling the inverter so that torque of the alternating current motor is maintained before and after the heat requirement condition is satisfied.

With the configuration, the first control is executed without any change in torque before and after the heat requirement condition is satisfied. As a result, it is possible to avoid a situation where drivability deteriorates due to a change in torque (for example, loss of torque).

In the electrified vehicle according to the aspect, the first control may include controlling the inverter so that the d-axis current becomes positive.

With the configuration, the reluctance torque of the alternating current motor becomes negative. As a result, the composite torque of the reluctance torque and the magnet torque becomes smaller than the composite torque when the d-axis current is negative. Accordingly, fluctuations in the composite torque are reduced. Therefore, it is possible to effectively avoid a situation in which comfort in the vehicle is impaired due to torque fluctuations.

In the electrified vehicle according to the aspect, the first control may include controlling the inverter so that when the electrified vehicle is stopped, only the d-axis current flows in the alternating current motor among the q-axis current and the d-axis current of the alternating current motor.

With the configuration, when the vehicle is stopped, it is possible to use the heat from the alternating current motor to heat the heating target while avoiding a situation where the comfort in the vehicle is impaired.

In the electrified vehicle according to the aspect, the first control may include controlling the inverter so as to increase line voltage of the alternating current motor compared to before the heat requirement condition is satisfied.

In the electrified vehicle according to the aspect, the loss increase control may further include second control for making the d-axis current smaller than the reference d-axis current when the index value is equal to or greater than a second threshold, the second threshold being equal to or greater than the first threshold.

In the electrified vehicle according to the aspect, the second control may include controlling the inverter so as to increase a current amplitude of the alternating current motor and advance a current advance angle of the alternating current motor compared to before the heat requirement condition is satisfied.

When the d-axis current is smaller than the reference d-axis current, the upper limit of the traveling speed (the rotation speed of the alternating current motor) of the electrified vehicle can be increased compared to the case where it is not. With the configuration, the d-axis current becomes smaller than the reference d-axis current. This allows the electrified vehicle to travel at high speed while increasing losses in the inverter and motor. When traveling at high speed, the reduction in comfort caused by reducing the d-axis current is not an issue.

In the electrified vehicle according to the aspect, volume generated from the alternating current motor during the second control may be greater than volume generated from the alternating current motor during the first control.

In the electrified vehicle according to the aspect, the index value may include a value indicating a traveling speed of the electrified vehicle.

In the electrified vehicle according to the aspect, the index value may include a value indicating the rotation speed.

The electrified vehicle according to the aspect may further include a temperature sensor that measures a temperature of the heating target. The heat requirement condition may be that the power loss is less than a required loss amount of the drive device. The required loss amount may be determined according to the temperature of the heating target and a target temperature of the heating target.

The electrified vehicle according to the aspect may further include a power storage device that stores power for driving the electrified vehicle. The heating target may be the power storage device. The heat requirement condition may include that a temperature of the power storage device is below a threshold temperature.

In the electrified vehicle according to the aspect, the heating target may be air in a vehicle cabin of the electrified vehicle. The heat requirement condition may include that heating of the air is requested.

The electrified vehicle according to the aspect may further include a power storage device that stores operating power of the drive device. The power storage device may be charged by charging power from charging equipment external to the electrified vehicle. The control device may be further configured to control the charging power. The control device may control the charging power to be a first charging power when the heat requirement condition is not satisfied during charging of the power storage device, and control the charging power to be a second charging power that is larger than the first charging power when executing the first control during the charging.

The first control may increase the power consumption of the power storage device because the drive device operates using the power of the power storage device. If the first control is executed during charging and the charging power is controlled to the first charging power, due to the increase in power consumption of the power storage device, the time (charging time) required to complete charging the power storage device may become longer. With the configuration, when the first control is executed during charging, charging power increases compared to when the first control is not executed during charging. Thereby, the increase in power consumption of the power storage device during the first control can be offset by the increase in charging power. Therefore, it is possible to avoid a situation where the charging time is prolonged.

With the present disclosure, it is possible to heat a heating target using heat from an alternating current motor while avoiding a situation in which the comfort inside the vehicle is impaired.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
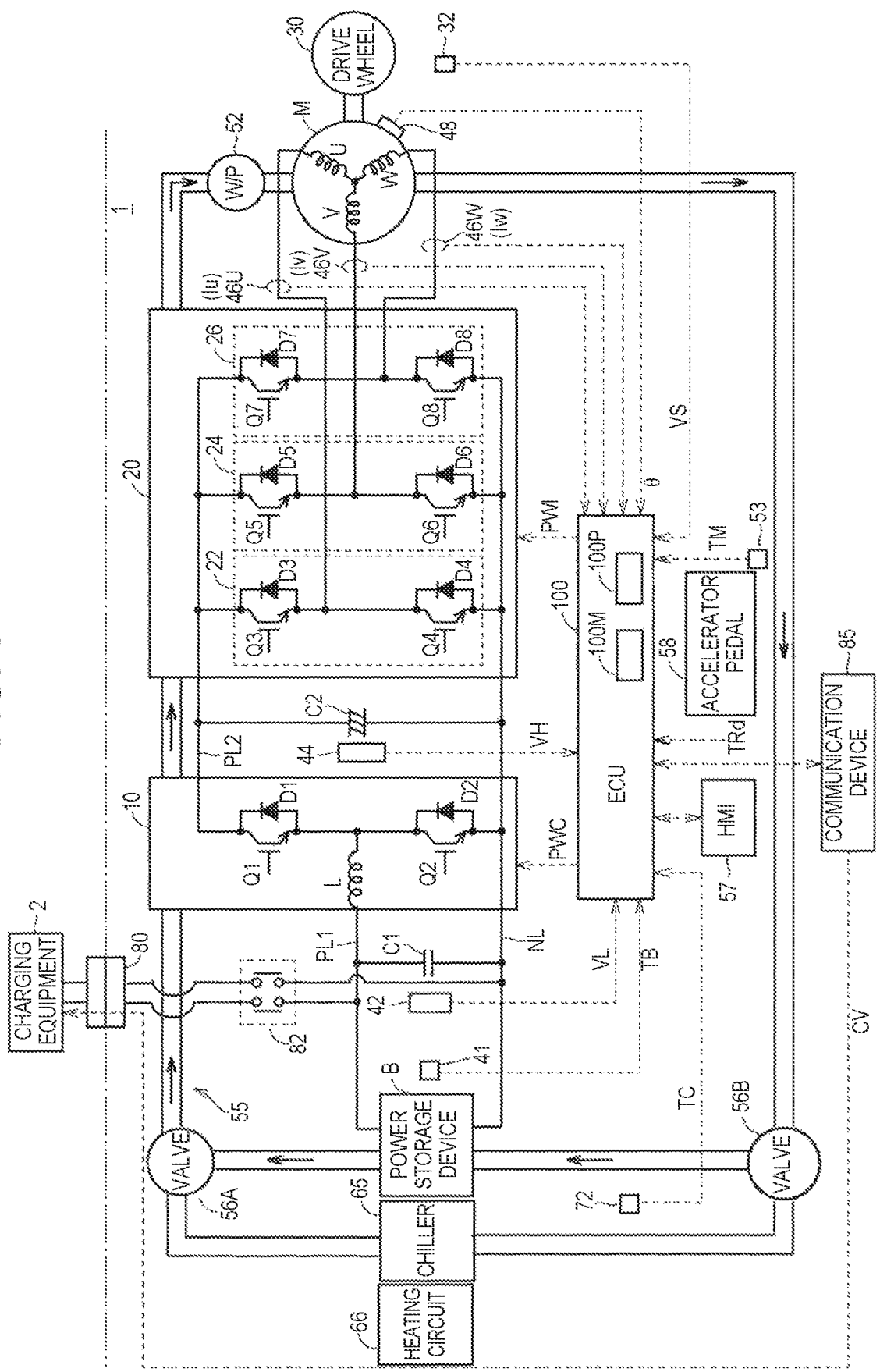
FIG. 1 is a diagram schematically illustrating a configuration of a vehicle according to an embodiment.

An embodiment of the present disclosure will be described in detail below with reference to the drawings. The same or corresponding parts in the figures are designated by the same reference numerals and letters, and their descriptions will not be repeated. The embodiment and its variations may be combined with each other as appropriate.

FIG. 1 is a diagram schematically illustrating the configuration of a vehicle according to the embodiment. This vehicle is an electric vehicle (battery electric vehicle: BEV) and is not equipped with an engine.

Referring to FIG. 1, a vehicle 1 includes a power storage device B, positive electrode lines PL1, PL2, a negative electrode line NL, a converter 10, an inverter 20, capacitors C1, C2, a motor M, a drive wheel 30, and a vehicle speed sensor 32. The vehicle 1 further includes a temperature sensor 41, voltage sensors 42, 44, current sensors 46U, 46V, 46W, and a rotation angle sensor 48. The vehicle 1 further includes a water pump (W/P) 52, a temperature sensor 53, a circulation circuit 55, switching valves 56A, 56B, a human machine interface (HMI) device 57, and an accelerator pedal 58. The vehicle 1 further includes a chiller 65, a heating circuit 66, a temperature sensor 72, an inlet 80, a charging relay 82, a communication device 85, and an ECU 100.

The power storage device B is a secondary battery such as a nickel metal hydride or lithium ion. The power storage device B supplies power to the converter 10 via the positive electrode line PL1 and the negative electrode line NL, and is charged by the converter 10 during power regeneration. The power storage device B stores power (specifically, operating power for the inverter 20 and the motor M) for allowing vehicle 1 to travel. The power storage device B can also be charged with charging power from charging equipment 2 outside the vehicle 1. Power storage device B may be a large capacity capacitor.

The converter 10 includes a reactor L, switching elements Q1, Q2, and diodes D1, D2. A first end of the reactor L is connected to the positive electrode line PL1, and a second end is connected to the switching elements Q1, Q2. The switching elements Q1, Q2 are connected in series between the positive electrode line PL2 and the negative electrode line NL. The diodes D1, D2 are respectively connected antiparallel to the switching elements Q1, Q2. The converter 10 operates according to a signal PWC, and uses the reactor L to boost the voltage supplied from the power storage device B.

The inverter 20 includes a U-phase arm 22, a V-phase arm 24, and a W-phase arm 26. The U-phase arm 22, the V-phase arm 24, and the W-phase arm 26 are connected in parallel between the positive electrode line PL2 and the negative electrode line NL. The U-phase arm 22 includes switching elements Q3, Q4 connected in series and diodes D3, D4 connected in antiparallel to the switching elements Q3 and Q4. The V-phase arm 24 includes switching elements Q5, Q6 connected in series and diodes D5, D6 connected in antiparallel to the switching elements Q5, Q6. The W-phase arm 26 includes switching elements Q7, Q8 connected in series and diodes D7, D8 connected in antiparallel to the switching elements Q7, Q8.

The midpoint of the U-phase arm 22 is connected to the U-phase coil of the motor M. Similarly, the midpoint of the V-phase arm 24 and the midpoint of the W-phase arm 26 are respectively connected to the V-phase coil and W-phase coil of the motor M.

Each of the switching elements Q1 to Q8 is, for example, an insulated gate bipolar transistor (IGBT) or a power metal oxide semiconductor field-effect transistor (MOSFET).

The inverter 20 converts the direct current power supplied from the power storage device B through the converter 10 into alternating current power in accordance with a signal PWI from the ECU 100, supplies the alternating current power to the motor M, and thereby drives motor M. The inverter 20 operates using power supplied from the power storage device B via the converter 10.

The capacitor C1 is connected between the positive electrode line PL1 and the negative electrode line NL, and smooths voltage fluctuations between the positive electrode line PL1 and the negative electrode line NL. The capacitor C2 is connected between the positive electrode line PL2 and the negative electrode line NL, and smooths voltage fluctuations between the positive electrode line PL2 and the negative electrode line NL.

The motor M is a three-phase alternating current motor, and more specifically, a three-phase embedded magnet kind synchronous motor. The motor M is configured to receive alternating current power from the inverter 20 and drive the drive wheel 30, thereby generating driving force for driving the vehicle 1. The torque of the motor M is represented by a composite torque of the magnet torque and reluctance torque of the motor M (described in detail below). The inverter 20 and the motor M correspond to examples of a "drive device" of the present disclosure.

The vehicle speed sensor 32 measures a traveling speed (vehicle speed VS) of the vehicle 1 by measuring the rotational speed of the drive wheel 30. The vehicle speed VS increases as the rotation speed of the motor M increases. The temperature sensor 41 measures a temperature TB of the power storage device B. The voltage sensor 42 measures voltage VL between both ends of the capacitor C1. The voltage sensor 44 measures voltage VH between both ends of the capacitor C2. The current sensors 46U, 46V, 46W respectively measure U-phase current (current Iu), V-phase current (current Iv), and W-phase current (current Iw) of the motor M. The current sensors 46U, 46V, 46W correspond to "current sensor units" of the present disclosure, and measure the alternating current flowing through the motor M. The rotation angle sensor 48 measures a rotation angle θ of the rotor of the motor M.

The water pump 52 pumps a heat medium (refrigerant) inside the circulation circuit 55. Thereby, the heat medium circulates in the circulation circuit 55. The temperature sensor 53 measures a temperature TM of the heat medium. The circulation circuit 55 is provided with a heat exchanger (not illustrated) near the power storage device B. This heat exchanger is used for the heat medium to exchange heat with the power storage device B. The heat medium is, for example, oil or cooling water. The circulation circuit 55 transfers heat generated due to power loss in the inverter 20 and motor M to a heating target via the heat medium. In this example, it is assumed that the heating target is the power storage device B. The circulation circuit 55 is an example of a "heat transfer device" of the present disclosure. The switching valves 56A, 56B are configured to be able to switch the flow of the heat medium in the circulation circuit 55.

The HMI device 57 receives various user operations and displays various screens. The user operation includes a heating request operation that requests heating of the cabin of the vehicle 1. The heating of the vehicle cabin includes heating that is instructed by a user while riding in the vehicle 1 and pre-heating that is reserved before the user enters the vehicle 1. The accelerator pedal 58 is operated by the user to accelerate the vehicle 1. A torque command value TRd is a torque command value for the motor M, and is calculated based on the operation amount of the accelerator pedal 58 by an external ECU (not illustrated).

The chiller 65 is provided in the circulation circuit 55 and is configured to exchange heat with the heating circuit 66. The heating circuit 66 is configured to heat the cabin of the vehicle 1 by transmitting heat from the chiller 65 to the cabin of the vehicle 1. The temperature sensor 72 measures a temperature TC of the air inside the vehicle.

The inlet 80 is configured to receive power from the charging equipment 2. The charging relay 82 is configured to be turned on/off, and when it is turned on, charging power from the charging equipment 2 is supplied to the power storage device B through the charging relay 82.

The communication device 85 is configured to communicate with the charging equipment 2 via a controller area network (CAN). The communication device 85 transmits, for example, a command value (command value CV) of the charging current from the charging equipment 2 to the power storage device B, to the charging equipment 2.

The ECU 100 includes a memory 100M and a processor 100P. The memory 100M includes a read only memory (ROM) and a random access memory (RAM) (both not illustrated). The processor 100P executes various calculation processes by executing programs stored in the ROM. The ECU 100 is an example of a "control device" of the present disclosure.

The ECU 100 controls various devices of the vehicle 1 such as the converter 10, the inverter 20, the motor M, the water pump 52, the switching valves 56A, 56B, the HMI device 57, the charging relay 82, and the communication device 85. The ECU 100 controls the motor M by controlling the inverter 20. In this example, the ECU 100 controls the switching valves 56A, 56B so that the heat medium of the circulation circuit 55 exchanges heat with the power storage device B (so as to warm the power storage device B) via the heat exchanger.

The ECU 100 generates the signals PWC, PWI based on the torque command value TRd, the temperatures TB, TM, TC, the voltage VL, VH, the currents Iu, Iv, Iw, the vehicle speed VS, and the rotation angle θ. The ECU 100 controls the converter 10 through the signal PWC, and controls the inverter 20 through the signal PWI. The ECU 100 is configured to be able to execute maximum torque control. The maximum torque control is to control the inverter 20 (the current Iu, Iv, Iw) through the signal PWI so that the current advance angle of the motor M is a current advance angle that maximizes the torque of the motor M for the same current amplitude.

The ECU 100 is configured to be able to execute external charging control that charges the power storage device B using the charging current from the charging equipment 2. The ECU 100 is configured to set the command value CV based on the State Of Charge (SOC) of the power storage device B and a target SOC, and to be able to transmit the command value CV to the charging equipment 2 through the communication device 85. The ECU 100 can control charging current from the charging equipment 2 to the power storage device B through the command value CV.

Figure 2:
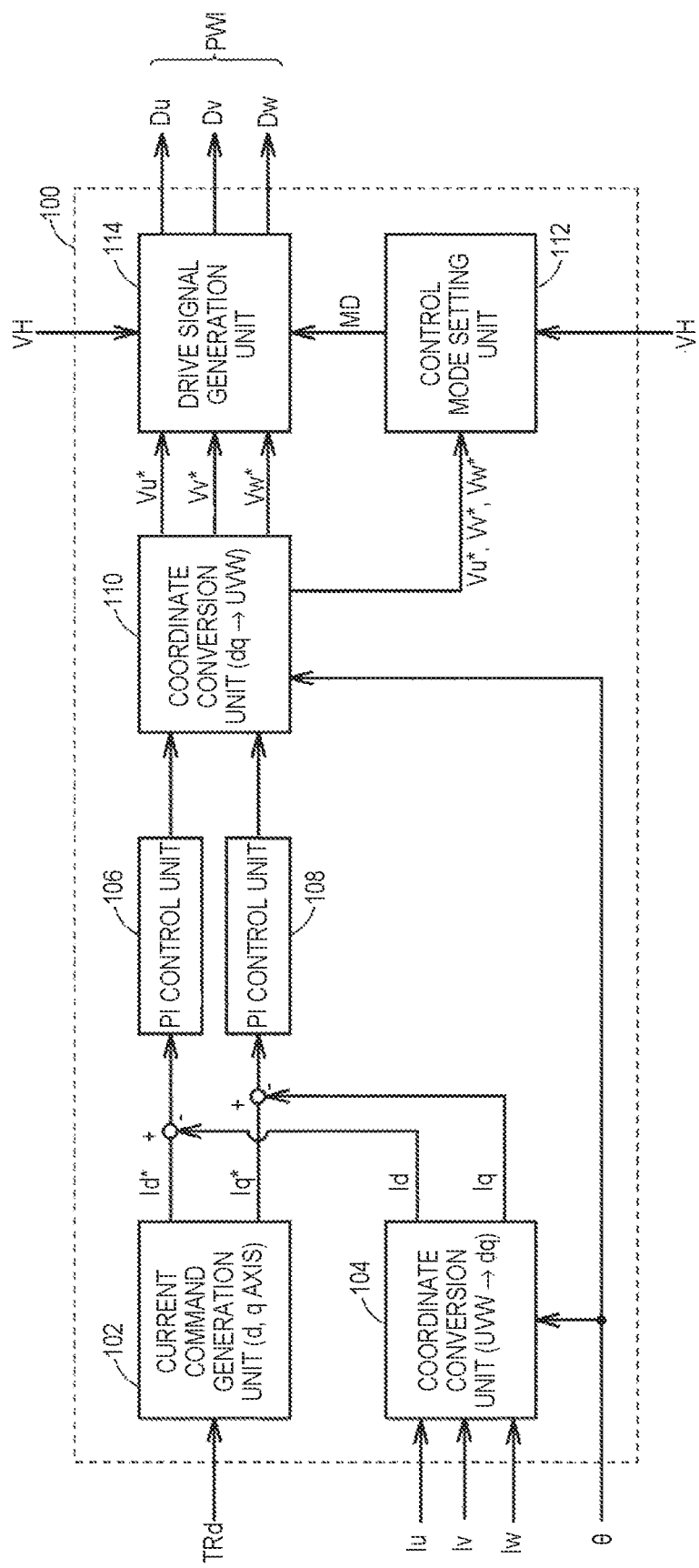
FIG. 2 is a functional block diagram regarding control of an inverter by an ECU.

FIG. 2 is a functional block diagram regarding control of the inverter 20 by the ECU 100. Referring to FIG. 2, the ECU 100 includes a current command generation unit 102, coordinate conversion units 104, 110, PI control units 106, 108, a control mode setting unit 112, and a drive signal generation unit 114.

The current command generation unit 102 generates a d-axis current command Id* and a q-axis current command Iq* based on the torque command value TRd and a predetermined map for each torque command value.

The coordinate conversion unit 104 converts the currents Iu, Iv, Iw into d-axis current Id and q-axis current Iq according to the rotation angle θ. The PI control unit 106 receives the deviation between the d-axis current command Id* and the d-axis current Id, and performs a proportional-integral calculation using the deviation as input, and then the PI control unit 106 provides the calculation result to the coordinate conversion unit 110 as a voltage command on the d-axis. The PI control unit 108 receives the deviation between the q-axis current command Iq* and the q-axis current Iq, and performs a proportional-integral calculation using the deviation as input, and then the PI control unit 108 provides the calculation result to the coordinate conversion unit 110 as a voltage command on the q-axis.

The coordinate conversion unit 110 converts, using the rotation angle θ, the voltage commands on the d and q axes respectively received from the PI control units 106, 108, into a U-phase voltage command Vu*, a V-phase voltage command Vv*, and a W-phase voltage command Vw*, and then the coordinate conversion unit 110 provides them to the drive signal generation unit 114 and the control mode setting unit 112.

The control mode setting unit 112 calculates a modulation rate that indicates the ratio of voltage commands Vu*, Vv*, Vw* to the voltage VH. The control mode setting unit 112 sets the control mode of the inverter 20 on the basis of the calculation result of the modulation rate, and provides the drive signal generation unit 114 with a signal MD instructing the set control mode.

Control modes of the inverter 20 include a PWM control mode and a rectangular wave control mode. In these control modes, the fundamental frequencies (carrier frequencies) for turning on/off the switching elements Q3 to Q8 are different from each other. The PWM control mode has a relatively high carrier frequency. The rectangular wave control mode has a relatively low carrier frequency. The control mode may further include an overmodulation control mode having a relatively moderate carrier frequency.

When the modulation rate is low, the control mode setting unit 112 sets the control mode to the PWM control mode. When the modulation rate becomes high, the control mode setting unit 112 sets the control mode to the rectangular wave control mode.

The drive signal generation unit 114 generates drive signals Du, Dv, Dw according to the control mode instructed by the signal MD and the voltage commands Vu*, Vv*, Vw*, and provides them to the inverter 20 as a signal PWI.

As a result, the switching elements Q3 to Q8 are controlled in a switched manner in accordance with the drive signals Du, Dv, Dw. Thereby, the currents Iu, Iv, Iw are controlled, and motor torque is generated based on the torque command value TRd.

Figure 3:
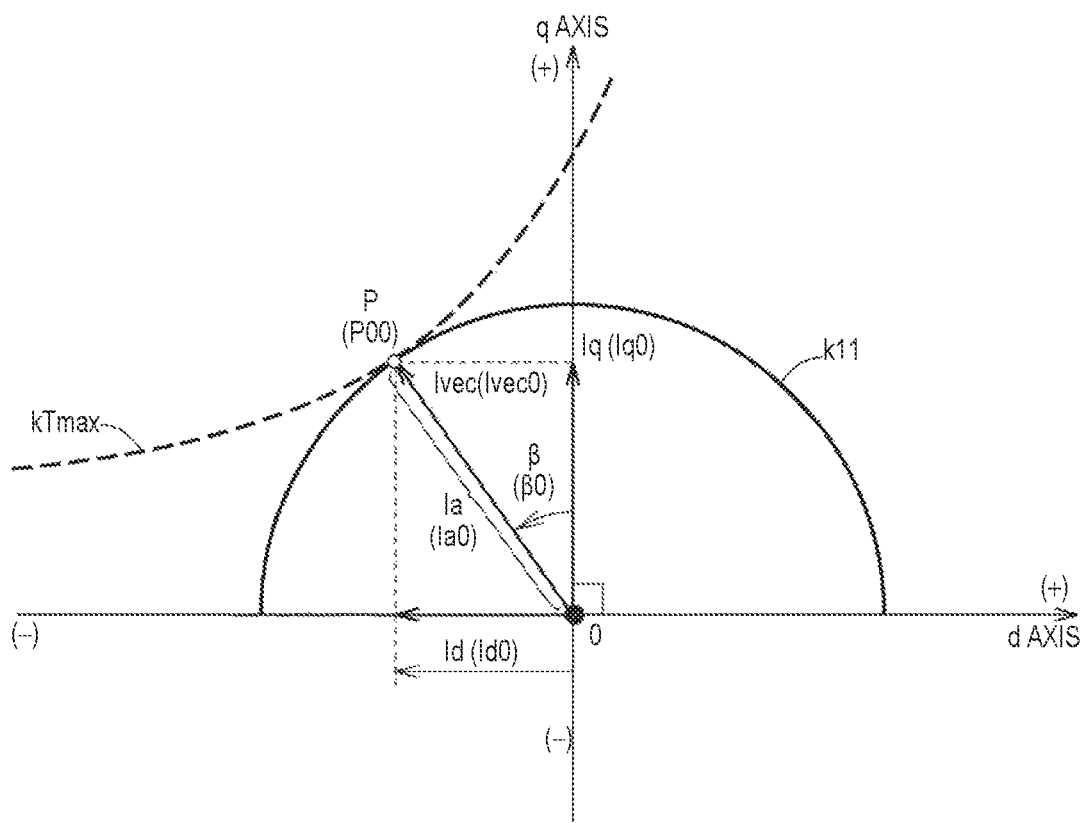
FIG. 3 is a diagram illustrating a current vector of a motor.

FIG. 3 is a diagram illustrating a current vector of the motor M. Referring to FIG. 3, a current vector Ivec is expressed in a d-q coordinate system defined by the d-axis of the motor M and the q-axis perpendicular to the d-axis.

The absolute value of the current vector Ivec corresponds to a current amplitude Ia. The angle of the current vector Ivec with respect to the q-axis corresponds to a current advance angle β of the motor M. When the d-axis component of the current vector Ivec is negative, the current advance angle β is positive. When the d-axis component of the current vector Ivec is positive, the current advance angle β is negative. The operating point corresponding to the current vector Ivec is also expressed as an operating point P. The current amplitude Ia and the current advance angle β (operating point P) are determined by the signal PWI.

A curve k11 represents a constant current curve corresponding to a reference current amplitude (described below). In other words, as long as the operating point P is on the curve k11, the current amplitude Ia is the reference current amplitude and is constant.

A curve kTmax represents a maximum torque curve, that is, the locus of the operating point P where the torque is maximum when the current amplitude Ia changes. In this example, the current vector Ivec during maximum torque control is expressed as a reference vector (Ivec0). The operating point P of Ivec0 is also expressed as an operating point P00. The operating point P00 corresponds to an intersection of the curve k11 and the curve kTmax.

The d-axis component, q-axis component, current amplitude Ia, and current advance angle β of Ivec0 are also respectively expressed as the reference d-axis current (Id0), reference q-axis current (Iq0), reference current amplitude (Ia0), and reference advance angle (β0). The fact that d-axis current Id is in the +d-axis direction relative to Id0 is also referred to as "d-axis current is larger than reference d-axis current". Similarly, the fact that d-axis current Id is in the −d-axis direction relative to Id0 is also referred to as "d-axis current is smaller than reference d-axis current". In the embodiment, Id0, Iq0, Ia0, and β0 respectively correspond to the d-axis current Id, the q-axis current Iq, the current amplitude Ia, and the current advance angle β when a heat requirement condition (described below) is not satisfied.

The ECU 100 is configured to be able to execute first control to control the inverter 20 so that the d-axis current Id is greater than Id0. When the d-axis current Id is positive, the first control corresponds to "strengthening field control". Specifically, the first control corresponds to controlling the inverter 20 so that the current amplitude Ia becomes larger than Ia0 and the current advance angle β becomes smaller than β0.

β<β0: First Control (Strengthening Field Control)

The ECU 100 is also configured to be able to execute second control to control the inverter 20 so that the d-axis current Id is smaller than Id0. The second control corresponds to "weakening field control" and reduces the back electromotive force of the motor M using negative d-axis current Id. This allows the vehicle 1 to travel at high speed. Specifically, the second control corresponds to controlling the inverter 20 so that the current amplitude Ia becomes larger than Ia0 and the current advance angle β becomes larger than β0.

β>β0: Second Control (Weakening Field Control)

Each of the first control and the second control is included in loss increase control (described below).

Referring again to FIG. 1, since the vehicle 1 is not equipped with an engine, the heating target (power storage device B) in the vehicle 1 cannot be heated using engine waste heat. The power storage device B may be heated using heat generated due to power losses in the inverter 20 and the motor M. Heat from the inverter 20 and the motor M is stored in the heat medium of the circulation circuit 55 and transferred to the power storage device B via the heat medium.

When a predetermined heat requirement condition is satisfied for requesting an increase in heat transferred to the power storage device B, the ECU 100 executes loss increase control to control the inverter 20 so as to increase power loss in the inverter 20 and the motor M compared to the case where the heat requirement condition is not satisfied. Loss increase control corresponds to control that causes the power loss to be larger than that of the maximum torque control.

The heat requirement condition is, for example, that the amount of heat generated from the inverter 20 and the motor M is less than the amount of heat required by the inverter 20 and the motor M. The amount of heat generated corresponds to the power loss in the inverter 20 and the motor M, and includes the conduction loss of the switching elements Q3 to Q8 and the copper loss of the motor M. The copper loss is determined according to the d-axis current Id and the q-axis current Iq (currents Iu, Iv, Iw) and the winding resistance of the motor M. The amount of heat required is the required amount of heat to be generated from the inverter 20 and the motor M in order to heat the power storage device B, and corresponds to the required amount of loss as the required amount of power loss in the inverter 20 and the motor M. The required amount of heat is determined, for example, according to the target temperature, specific heat, and temperature TB of the power storage device B, and the specific heat and temperature TM of the heat medium. The target temperature is determined in advance through experiments as a temperature at which the power storage device B can be sufficiently charged or discharged in practice when temperature TB is the target temperature.

The heat requirement condition may be that the temperature TB of the power storage device B is below a threshold temperature. The threshold temperature may be the same as or different from the target temperature.

The ECU 100 calculates the loss increase amount in the inverter 20 and the motor M in response to satisfaction of the heat requirement condition. The loss increase amount is the difference between the required heat amount and the generated amount of heat of the inverter 20 and motor M.

In order to increase the heat transferred to the power storage device B, it is necessary for the ECU 100 to execute loss increase control, but vibration and operating noise of the motor M may increase during the loss increase control. When the vehicle 1 is traveling at high speed (when the motor M is rotating at high speed), even when the vibration and operating noise increase when the loss of the motor M increases, the vibration and operating noise of the motor M are less noticeable due to road noise. As a result, there is a low possibility that comfort in the vehicle cabin will be impaired. On the other hand, when the vehicle 1 is traveling at low speed or stopped (when the motor M is rotating at low speed or stopped), if the vibration and operating noise increase when the loss of the motor M increases, the vibration and operating noise are likely to be noticeable. As a result, the noise vibration (NV) performance may deteriorate and the comfort in the vehicle cabin may be impaired.

The vehicle 1 according to the embodiment has features for addressing the above problems. This point will be described below.

Figure 4:
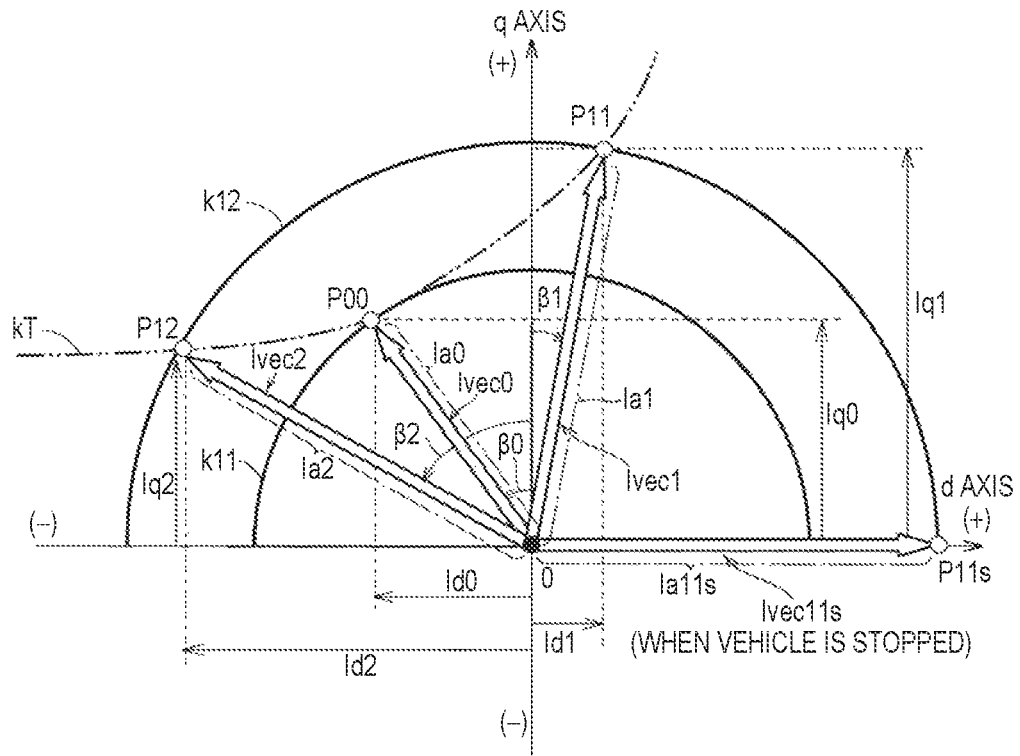
FIG. 4 is a diagram for illustrating characteristics of control by the ECU.

FIG. 4 is a diagram for illustrating the characteristics of control by the ECU 100. Referring to FIG. 4, the current vector Ivec during the first control is, for example, Ivec1. The d-axis component, q-axis component, current amplitude Ia, and current advance angle β of Ivec1 are respectively Id1, Iq1, Ia1, and β1. The operating point P corresponding to Ivec1 is P11.

The current vector Ivec during the second control is, for example, Ivec2. The d-axis component, q-axis component, current amplitude Ia, and current advance angle β of Ivec2 are respectively Id2, Iq2, Ia2, and β2. The operating point P corresponding to Ivec2 is P12.

In this example, Id1>Id0, Id2<Id0, Ia1=Ia2>Ia0, β1<β0, β2>β0. That is, (Ia0<Ia1, Ia2)

(β1<β0<β2)

A curve k12 represents a constant current curve corresponding to Ia1 (Ia2). A curve kT represents a constant torque curve corresponding to the point P00. In other words, as long as the operating point P is on the curve kT, the torque of the motor M is constant.

The ECU 100 is characterized in that, in the loss increase control, the first control is executed when an index value regarding the rotation speed of the motor M is less than a predetermined first threshold. In the embodiment, this index value corresponds to the vehicle speed VS, and the first threshold value corresponds to a predetermined first threshold speed (for example, 40 km/h). The first control is to control the inverter 20 so that the d-axis current Id becomes larger than Id0 (for example, so that it becomes Id1). In this example, the first control corresponds to controlling the inverter 20 so as to increase the current amplitude Ia and delay the current advance angle β, that is, change the operating point P from P00 to P11 (Ia0→Ia1, β0→β1) compared to before the heat requirement condition is satisfied while the vehicle 1 is traveling. The first control is also to control the inverter 20 to increase the line voltage of the motor M compared to before the heat requirement condition is satisfied.

The vehicle speed VS being less than the first threshold speed corresponds to the rotation speed of the motor M being less than a predetermined first threshold rotation speed. Values indicating the first threshold speed and the first threshold rotation speed are stored in the memory 100M.

As will be described below, according to the first control, it is possible to avoid a situation in which the comfort in the vehicle cabin is impaired when the vehicle 1 is traveling at low speed (when the motor M is rotating at low speed).

Figure 5:
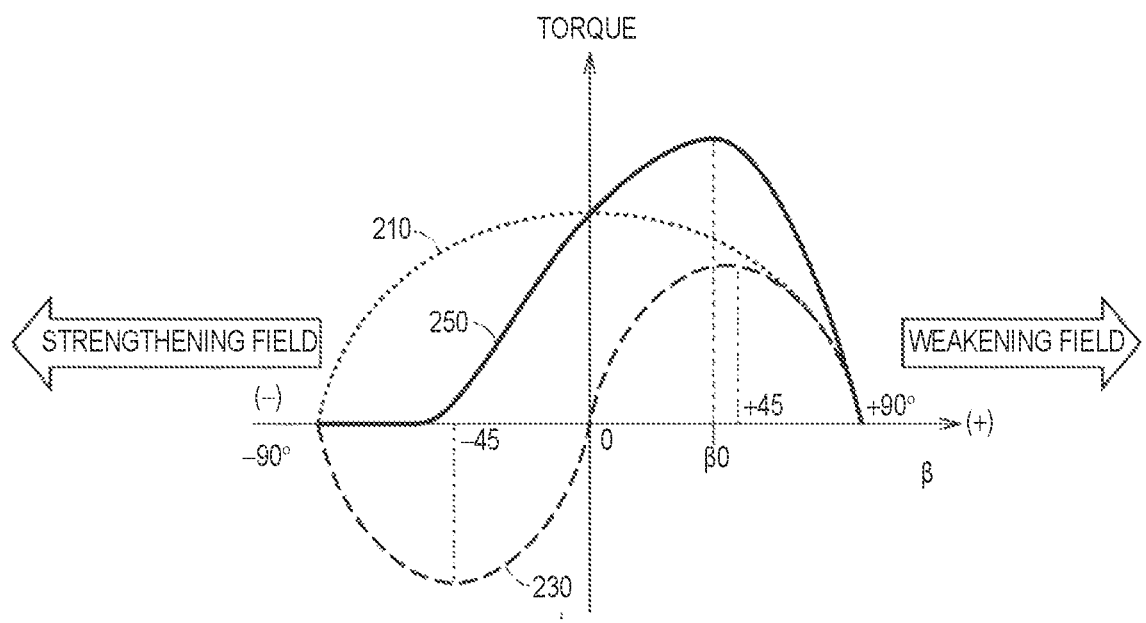
FIG. 5 is a diagram illustrating a relationship between torque of the motor and a current advance angle.

FIG. 5 is a diagram illustrating the relationship between the torque of the motor M and the current advance angle β. Referring to FIG. 5, a curve 210 represents the relationship between magnet torque and the current advance angle β. A curve 230 represents the relationship between reluctance torque and the current advance angle β. A curve 250 represents the relationship between composite torque of the magnet torque and the reluctance torque and the current advance angle β.

As illustrated in the curves 230, 250, especially when the current advance angle β is negative, the reluctance torque is negative. As a result, the composite torque becomes smaller than when the current advance angle β is somewhat larger than β0 (weakening field control). Therefore, even when the d-axis current Id and q-axis current Iq (current advance angle β) change due to changes in the torque command value TRd, currents Iu, Iv, Iw, or rotation angle θ during control of the inverter 20 by the ECU 100, the amount of torque fluctuation is small.

According to the first control, when the heat requirement condition is satisfied (when the loss increase control is executed) and the vehicle speed VS is less than the first threshold speed (when the vehicle 1 is traveling at low speed or stopped), the d-axis current Id is controlled to be larger than Id0 (FIG. 4). That is, the current advance angle β is controlled to be smaller than β0. By causing the d-axis current to be larger than that of the maximum torque control (reducing the current advance angle β), there is an advantage that loss can be increased without changing the operating point of torque and rotation speed, and torque fluctuations are less likely to occur. Therefore, it is possible to avoid a situation in which the comfort in the vehicle cabin is impaired. Further, the heat transferred from the motor M to the power storage device B through the heat medium of the circulation circuit 55 increases due to the increase in power loss of the motor M during the first control. Thereby, power storage device B can be heated using heat from the motor M without engine waste heat or a dedicated battery heater.

Referring again to FIG. 4, when the heat requirement condition is not satisfied, the ECU 100 sets the current advance angle β so as to maximize the torque of the motor M (become β0) for the same current amplitude Ia (P00). Thereby, when an increase in loss in the motor M is not required, torque can be efficiently generated while reducing power loss in the motor M.

In the embodiment, in the loss increase control while the vehicle 1 is traveling, the ECU 100 controls the inverter 20 so that the torque (and rotation speed) of the motor M is maintained before and after (before and after the start of the first control) the heat requirement condition is satisfied (for example, the operating point P is switched from P00 to P11 so that the current vector Ivec changes along the constant torque curve kT). Thereby, it is possible to avoid a situation in which drivability deteriorates due to torque fluctuation (loss of torque) before and after the heat requirement condition is satisfied.

In this example, since Id1 is positive, the first control corresponds to controlling the inverter 20 so that the d-axis current Id becomes positive. With this control, since the current advance angle β is negative, torque fluctuations are effectively reduced (see FIG. 5). Therefore, it is possible to more effectively avoid the situation in which comfort in the vehicle cabin is impaired due to torque fluctuations.

In the first control, the ECU 100 can also control the inverter 20 so that only the d-axis current Id flows in the motor M among the q-axis current Iq and the d-axis current Id when the vehicle 1 is stopped. In this case, the current vector Ivec is, for example, Ivec11s. The d-axis component, q-axis component, current amplitude Ia, and current advance angle β of Ivec11s are respectively Ia11s, 0, Ia11s, and 90°. The operating point P corresponding to Ivec11s is P11s. In this example, Ia11s is equal to Ia1.

By controlling the inverter 20 as described above, since the q-axis current Iq is 0, no torque is generated from the motor M (while the vehicle 1 is stopped), thereby making it possible to avoid a situation where the comfort in the vehicle cabin is impaired, and the power storage device B can be heated using heat from the motor M.

The ECU 100 is also characterized in that, in the loss increase control, the second control is executed when the vehicle speed VS is equal to or higher than a second threshold speed. The second threshold speed is equal to or greater than the first threshold speed, and in this example is equal to the first threshold speed. The second threshold speed corresponds to an example of the "second threshold" of the present disclosure. The second control is to control the inverter 20 so that the d-axis current Id is smaller than Id0 (for example, it becomes Id2). In this example, the second control corresponds to controlling the inverter 20 to increase the current amplitude Ia and advance the current advance angle β, that is, change the operating point P from P00 to P12 (Ia0→Ia1, β0→β2) at the beginning (when the heat requirement condition is satisfied). The second control is also to control the inverter 20 to reduce the line voltage of the motor M to be less than that before the heat requirement condition is satisfied. The volume generated from the motor M during the second control is larger than the volume generated from the motor M during the first control.

When the d-axis current Id is smaller than Id0, the back electromotive force of the motor M is smaller than when the d-axis current Id is not smaller than Id0, so the upper limit of the vehicle speed (rotation speed of the motor M) can be increased. This makes it possible to increase the loss when the vehicle 1 travels at high speed. Under high-speed traveling, the reduction in comfort caused by harmonics (described below) generated during weakening field control is not an issue. With the second control, when the heat requirement condition is satisfied (when loss increase control is executed) and the vehicle speed is equal to or higher than the second threshold speed (when the vehicle 1 is at high speed), the d-axis current Id becomes smaller than Id0. Thereby, it is possible to make the vehicle 1 travel at high speed, heat the power storage device B using the heat from the motor M, and avoid the situation in which comfort in the vehicle cabin is impaired.

The vehicle speed VS being less than the second threshold speed corresponds to the rotation speed of the motor M being less than the predetermined second threshold rotation speed. Values indicating the second threshold speed and the second threshold rotation speed are stored in the memory 100M.

Hereinafter, in order to describe other advantages of the embodiment, control by the ECU in a comparative example will be described. In the loss increase control, this ECU executes weakening field control of the motor M regardless of the vehicle speed VS. As a result, even when the vehicle speed VS is so low as to be below the first threshold speed (particularly while the vehicle is stopped), the quietness (comfort in the vehicle cabin) of the motor M is likely to be impaired due to harmonics generated during weakening field control.

In addition, in the comparative example, the motor M is likely to be demagnetized by executing the weakening field control regardless of the vehicle speed VS. Demagnetization is more likely to occur as the rotor temperature of the motor M increases. In order to prevent demagnetization, the ECU needs to successively estimate (or detect) the rotor temperature so that it does not rise excessively. This rotor temperature estimation accuracy needs to be high. While the vehicle 1 is traveling, the ECU can estimate the rotor temperature based on the back electromotive force that is proportional to the rotation speed of the motor M, whereas when the vehicle 1 is stopped (the motor M is not rotating), the back electromotive force is zero, thus making it difficult for the ECU to estimate the rotor temperature in this way.

On the other hand, in the embodiment, when the vehicle speed VS is less than the first threshold speed, the d-axis current Id becomes larger than Id0 due to the first control (for example, the strengthening field control is executed). As a result, harmonics are reduced, and it is possible to avoid a situation in which the quietness of the motor M is impaired (even when the vehicle is stopped, for example). In addition, since the magnetic flux of the rotor is not weakened (for example, the magnetic flux of the rotor is strengthened during strengthening field control) compared to the comparative example, demagnetization is less likely to occur. Therefore, in order to prevent demagnetization, the ECU 100 does not need to estimate (or detect) the rotor temperature or need to have high rotor temperature estimation accuracy. Thus, the embodiment has advantages over the comparative example.

Figure 6:
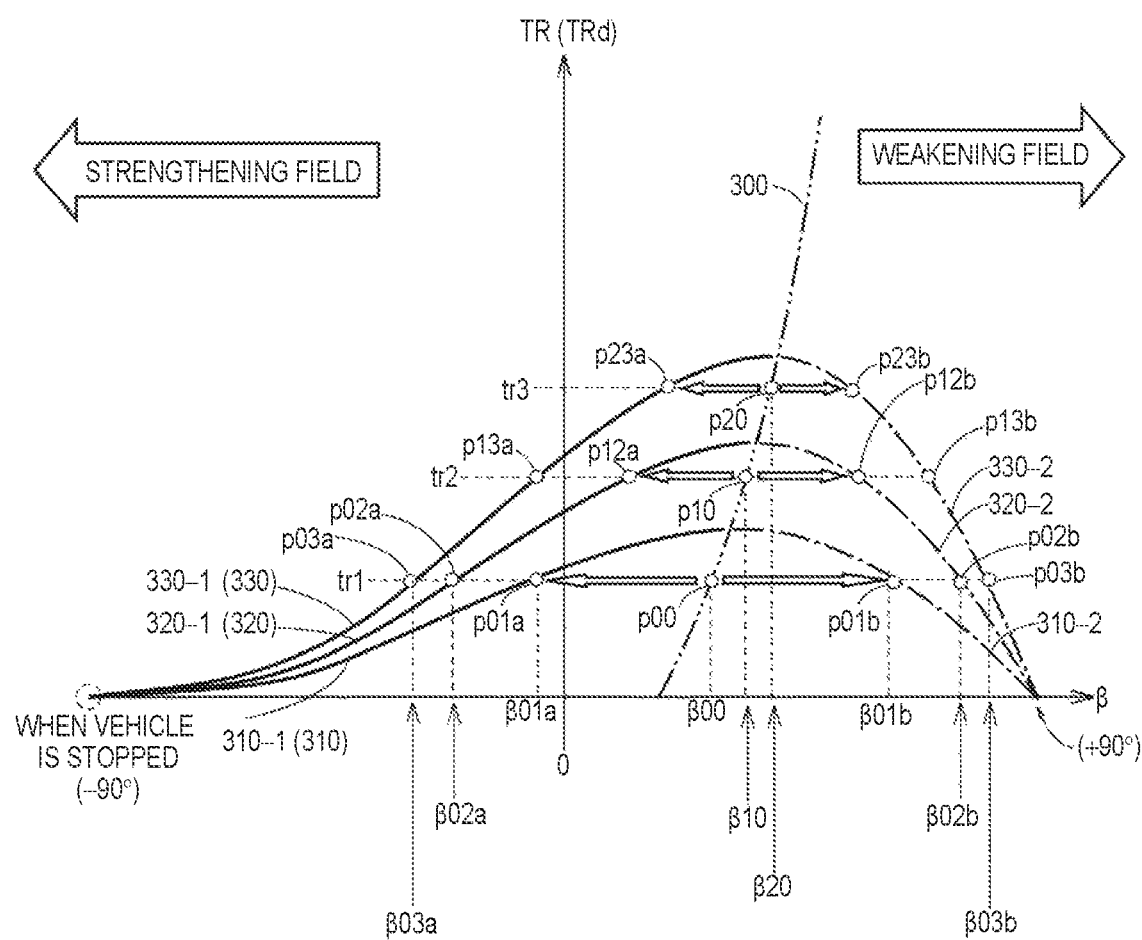
FIG. 6 is a diagram for illustrating how the relationship between the torque of the motor and the current advance angle changes depending on current amplitude.

FIG. 6 is a diagram for illustrating how the relationship between the torque (torque command value TRd) of the motor M and the current advance angle β changes depending on the current amplitude Ia. This diagram is also called a TR-β characteristic diagram. The illustrated relationships are based on the curve 250 (FIG. 5).

Referring to FIG. 6, a line 300 represents the relationship between the torque TR and the current advance angle β during maximum torque control. The operating point is on the line 300 before the heat requirement condition is satisfied. For example, when the current advance angle β is β00, β10, or β20, the operating point is determined so that the torque TR becomes tr1, tr2, or tr3 (p00, p10, or p20) respectively.

Lines 310, 320, 330 respectively represent the relationship between the torque TR and the current advance angle β when the current amplitudes Ia are IaA, IaB, IaC (IaA<IaB<IaC) (that is,
- (310: Ia=IaA)
- (320: Ia=IaB)
- (330: Ia=IaC)
- (IaA<IaB<IaC)).

Lines 310-1, 310-2 are respectively parts of the line 310 drawn to the right and left of the line 300. Lines 320-1, 320-2 are respectively parts of the line 320 drawn to the right and left of the line 300. Lines 330-1 and 330-2 are respectively parts of the line 330 drawn to the right and left of the line 300.

Points p01a, p01b, p02a, p02b, p03a, p03b are respectively points on the lines 310-1, 310-2, 320-1, 320-2, 330-1, 330-2 that have the same torque TR (tr1) as the point p00. Points p12a, p12b, p13a, p13b are respectively points on the lines 320-1, 320-2, 330-1, 330-2 that have the same torque TR (tr2) as the point p10. Points p23a, p23b are respectively points on the lines 330-1, 330-2 that have the same torque TR (tr3) as the point p20.
- (p00: Ia=IaA0)
- (p10: Ia=IaB0)
- (p20: Ia=IaC0)
- (IaA0<IaB0<IaC0)
- (IaA0<IaA)
- (IaB0<IaB)
- (IaC0<IaC)

Each of points p01a, p02a, p03a corresponds to the operating point P11 (FIG. 4). Similarly, each of points p01b, p02b, p03b corresponds to the operating point P12.

As described below, each of the relationships shown by the lines 300, 310-1, 310-2, 320-1, 320-2, 330-1, 330-2 is used to calculate the current advance angle β corresponding to the torque command value TRd.

Figure 7:
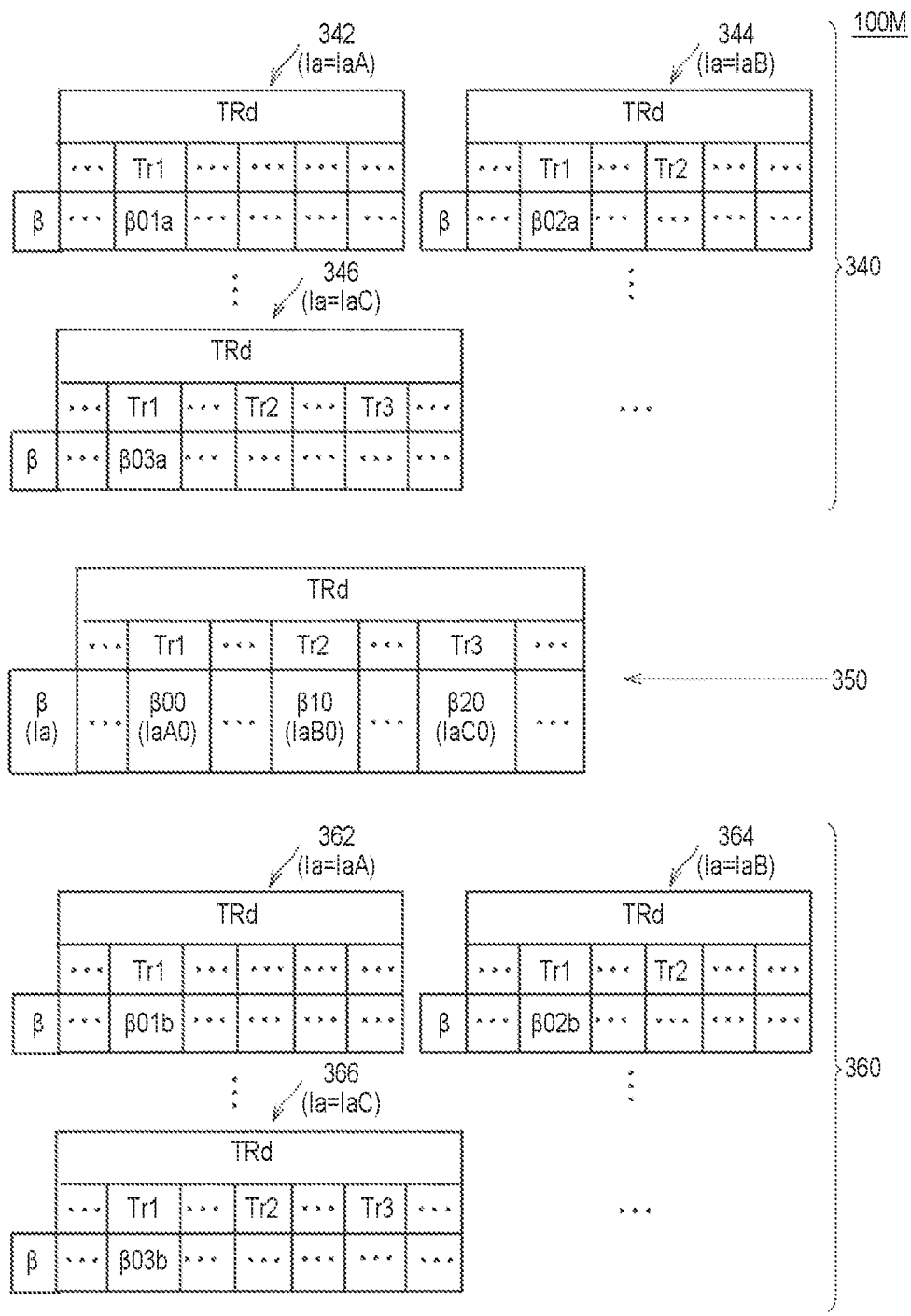
FIG. 7 is a diagram schematically illustrating a map used to calculate the current advance angle corresponding to a torque command value.

FIG. 7 is a diagram schematically illustrating a map used to calculate the current advance angle β corresponding to the torque command value TRd. Referring to FIG. 7, map groups 340, 360, and a map 350 are stored in the memory 100M.

The map group 340 includes maps 342, 344, 346. The maps 342, 344, 346 respectively correspond to the relationships shown in the lines 310-1, 320-1, 330-1. The map 350 corresponds to the relationship shown in the line 300. The map group 360 includes maps 362, 364, 366. The maps 362, 364, 366 respectively correspond to the relationships shown in the lines 310-2, 320-2, 330-2.

The ECU 100 selects the map used to calculate the current advance angle β according to whether the heat requirement condition is satisfied (and the loss increase amount when the heat requirement condition is satisfied). The ECU 100 calculates the current advance angle β corresponding to the torque command value TRd according to the torque command value TRd and the selected map. The ECU 100 generates a d-axis current command Id* and a q-axis current command Iq* according to the current amplitude Ia and current advance angle β corresponding to the selected map, thereby controlling the inverter 20 (see FIGS. 2 and 4).

Hereinafter, with reference to FIGS. 6 and 7, a description will be given of how the ECU 100 switches the operating point in the TR-β characteristic diagram.

Before the heat requirement condition is satisfied, the ECU 100 selects the map 350 to execute maximum torque control. The ECU 100 uses the map 350 to calculate the current amplitude Ia and current advance angle β according to the torque command value TRd, and thereby executes maximum torque control. During maximum torque control, the operating point is on the line 300, which is p00 in this example.

After the heat requirement condition is satisfied, the ECU 100 executes the first control or the second control according to the vehicle speed VS.

At the start of the first control, the ECU 100 switches the operating point from p00 to, for example, the point p01a. In this case, the ECU 100 controls the inverter 20 to increase the current amplitude Ia from IaA0 to IaA and to delay the current advance angle β from β00 to β01a. Specifically, the ECU 100 uses the map 342 (line 310-1) to calculate the current advance angle β (β001a) during the first control according to tr1, and thereby executes the first control.

At the start of the first control, the ECU 100 may select the map 344 (line 320-1) instead of the map 342 (line 310-1). In this case, the operating point switches from p00 to p02a. Similarly, the ECU 100 may select the map 346 (line 330-1) instead of the map 342 (line 310-1). In this case, the operating point switches from p00 to p03a.

The decision of which of the maps 342, 344, or 346 is used by the ECU 100 (switch the operating point from p00 to which of p01a, p02a, or p03a) depends on the loss increase amount.

For example, when the loss increase amount is relatively small, the ECU 100 selects the map 342 and switches the operating point to the point p01a. That is, the ECU 100 controls the inverter 20 to increase the current amplitude Ia from IaA0 to IaA. When the loss increase amount is moderate, the ECU 100 selects the map 344 and switches the operating point to p02a. That is, the ECU 100 controls the inverter 20 to increase the current amplitude Ia from IaA0 to IaB. When the loss increase amount is relatively large, the ECU 100 selects the map 346 and switches the operating point to p03a. That is, the ECU 100 controls the inverter 20 to increase the current amplitude Ia from IaA0 to IaC.

At the start of the second control, the ECU 100 switches the operating point from p00 to, for example, the point p01b. In this case, the ECU 100 controls the inverter 20 to increase the current amplitude Ia from IaA0 to IaA and to advance the current advance angle β from β00 to β01b. Specifically, the ECU 100 uses the map 362 (line 310-2) to calculate the current advance angle β (β01b) during the second control according to tr1, and thereby executes the second control.

At the start of the second control, the ECU 100 may select the map 364 (line 320-2) instead of the map 362 (line 310-2). In this case, the operating point switches from p00 to p02b. Similarly, the ECU 100 may select the map 366 (line 330-2) instead of the map 362 (line 310-2). In this case, the operating point switches from p00 to p03b.

The decision of which of the maps 362, 364, 366 is used by the ECU 100 (the operating point is switched from p00 to which of p01b, p02b, or p03b) depends on the loss increase amount.

For example, when the loss increase amount is relatively small, the ECU 100 selects the map 362 and switches the operating point to the point p01b. That is, the ECU 100 controls the inverter 20 to increase the current amplitude Ia from IaA0 to IaA. When the loss increase amount is moderate, the ECU 100 selects the map 364 and switches the operating point to p02b. That is, the ECU 100 controls the inverter 20 to increase the current amplitude Ia from IaA0 to IaB. When the loss increase amount is relatively large, the ECU 100 selects the map 366 and switches the operating point to the point p03b. That is, the ECU 100 controls the inverter 20 to increase the current amplitude Ia from IaA0 to IaC.

Even when the operating point is p10 during the maximum torque control and the heat requirement condition is satisfied immediately thereafter, the ECU 100 executes the first control or the second control according to the vehicle speed VS. At the start of the first control, the ECU 100 switches the operating point from p10 to, for example, p12a or p13a according to the loss increase amount. At the start of the second control, the ECU 100 switches the operating point from the point p10 to, for example, the point p12b or p13b. Even when the operating point is p20 during the maximum torque control, the ECU 500 executes the same control as above.

In this example, each of IaA0, IaB0, IaC0 corresponds to Ia0 (FIG. 4). Each of IaA, IaB, IaC corresponds to Ia1. Similarly, each of β00, β10, β20 corresponds to β0. Each of β01a, β02a, β03a corresponds to p1. Each of β01b, β02b, β03b corresponds to β2.

Figure 8:
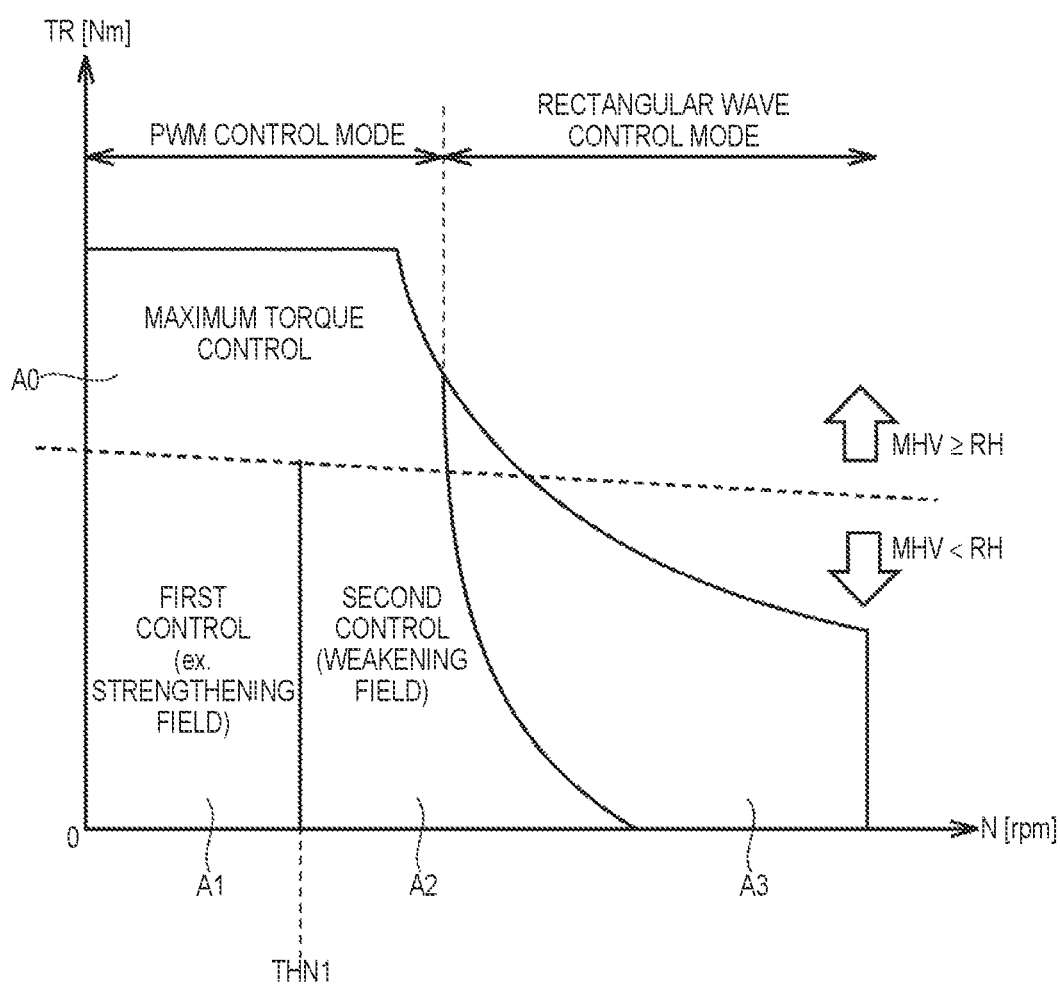
FIG. 8 is a diagram illustrating how control by the ECU changes depending on a rotation speed and torque of the motor.

FIG. 8 is a diagram illustrating how the control by the ECU 100 changes depending on the rotation speed and torque of the motor M. This diagram is also called a TR-N characteristic diagram.

Referring to FIG. 8, the ECU 100 selects a control mode for the inverter 20 based on a rotation speed N and torque TR of the motor M. Specifically, the ECU 100 selects the PWM control mode when the operating point in the TR-N characteristic diagram is within areas A0, A1, A2 (low rotation speed area). On the other hand, the ECU 100 selects the rectangular wave control mode when the operating point is within the area A3 (high rotation speed area). In the rectangular wave control mode, the ECU 100 does not execute loss increase control.

In the low rotation speed area of the TR-N characteristic diagram, the ECU 100 executes either the maximum torque control, the first control, or the second control according to a heat generation amount MHV from the inverter 20 and motor M, a required heat amount RH of the inverter 20 and motor M, and the rotation speed N.

For example, when the heat generation amount MHV is equal to or greater than the required heat amount RH, the heat generation amount MHV is already sufficient to heat the power storage device B. In this case, since loss increase control is not required, the ECU 100 executes the maximum torque control (area A0).

On the other hand, when the heat generation amount MHV is less than the required heat amount RH, the heat generation amount MHV is not sufficient to heat the power storage device B. In this case, the ECU 100 executes the loss increase control to increase the heat generation amount MHV.

In the loss increase control, the ECU 100 executes the first control when the rotation speed N is less than a threshold rotation speed THN1 (area A1). At the origin in the area A1, the ECU 500 controls the inverter 20 so that power loss in the inverter 20 and motor M increases depending on the required heat amount RH while maintaining the q-axis current Iq at zero. In the part of the area A1 that is different from the origin, the ECU 500 controls the inverter 20 so that the d-axis current Id becomes larger than Id0, the torque TR matches the torque command value TRd, and the power loss increases depending on the required heat amount RH.

In the loss increase control, the ECU 100 executes the second control when the rotation speed N is equal to or higher than the threshold rotation speed THN1 (area A2). Specifically, the ECU 100 controls the inverter 20 so that the d-axis current Id becomes smaller than Id0, the torque TR matches the torque command value TRd, and the power loss increases depending on the required heat amount RH.

Figure 9:
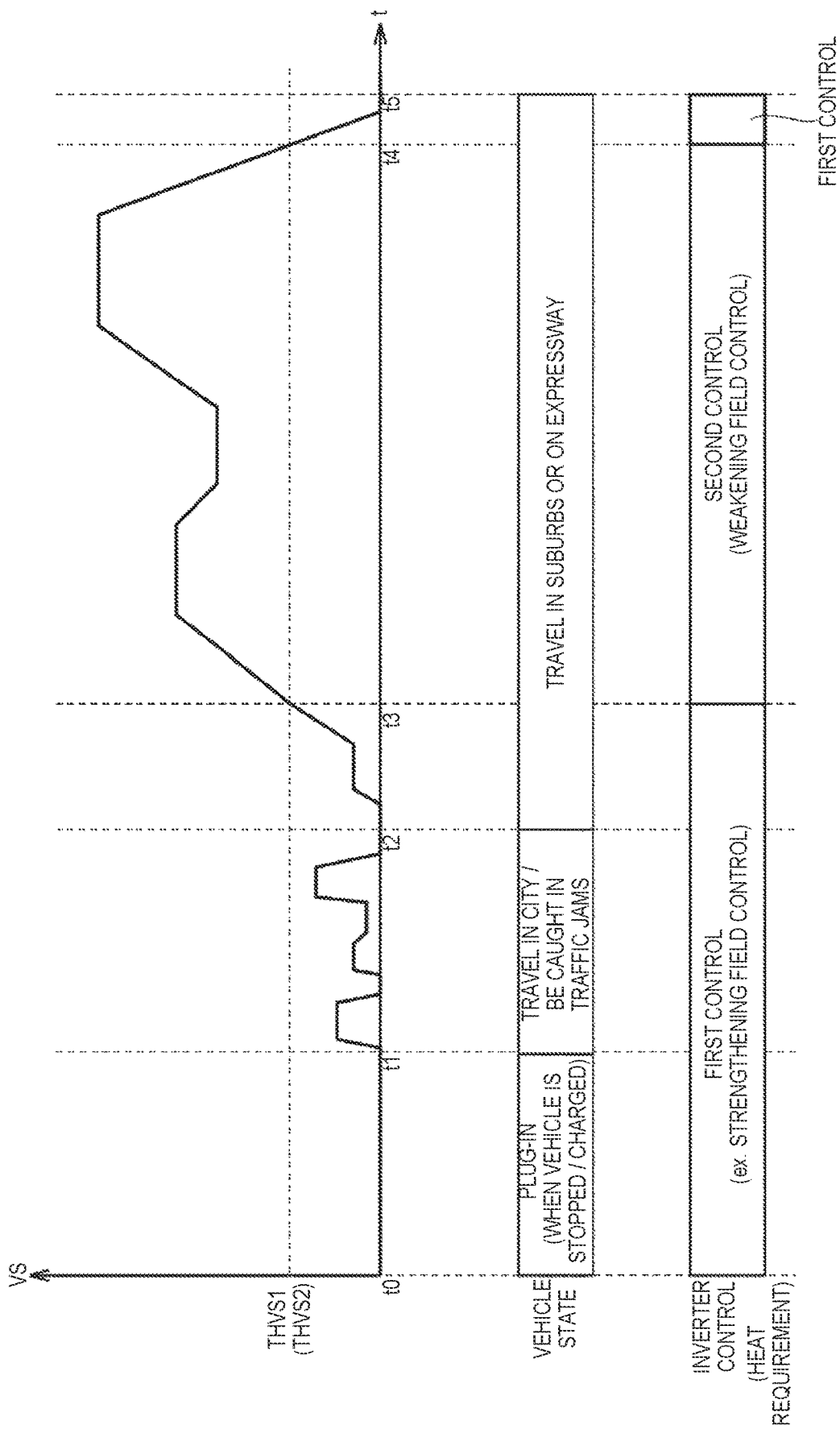
FIG. 9 is a diagram for illustrating an example of transition of inverter control by the ECU.

FIG. 9 is a diagram for illustrating an example of transition of inverter control (motor control) by the ECU 100. Referring to FIG. 9, the horizontal axis represents time, and the vertical axis represents the vehicle speed VS. In this example, it is assumed that the heat requirement condition is satisfied during the period from when the vehicle 1 starts traveling until it stops, and the power storage device B continues to be heated using heat from the motor M.

During the period from time t0 to time t1, the vehicle 1 is stopped in a state (plug-in state) where the vehicle 1 is connected to the charging equipment 2 through the inlet 80. The ECU 500 executes the first control to heat the power storage device B while executing external charging control. This first control corresponds to controlling the inverter 20 so that only the d-axis current Id flows in the motor M. The first control during the external charging control will be described below in a modification example 2.

During the period from time t1 to time t2, the vehicle 1 travels in the city or is caught in traffic jams. During the period from time t2 to time t3, the vehicle 1 travels in the suburbs or on the expressway. During these periods, the ECU 500 executes the first control when the vehicle 1 is traveling or stopped. During the period from time t0 to time t3, the vehicle speed VS is less than a threshold speed THVS1 (threshold speed THVS2). The threshold speeds THVS1, THVS2 respectively correspond to examples of a first threshold speed and a second threshold speed.

When the vehicle speed VS exceeds the threshold speed THVS2 at time t3, the ECU 100 switches the first control to the second control. During the period from time t3 to time t4, since the vehicle speed VS is equal to or higher than the threshold speed THVS2, the ECU 500 continues the second control.

When the vehicle speed VS falls below the threshold speed THVS2 at time t4, the ECU 100 switches the second control to the first control. During the period from time t4 to t5, since the vehicle speed VS is less than the threshold speed THVS1, the first control continues until the vehicle 1 stops at time t5.

Figure 10:
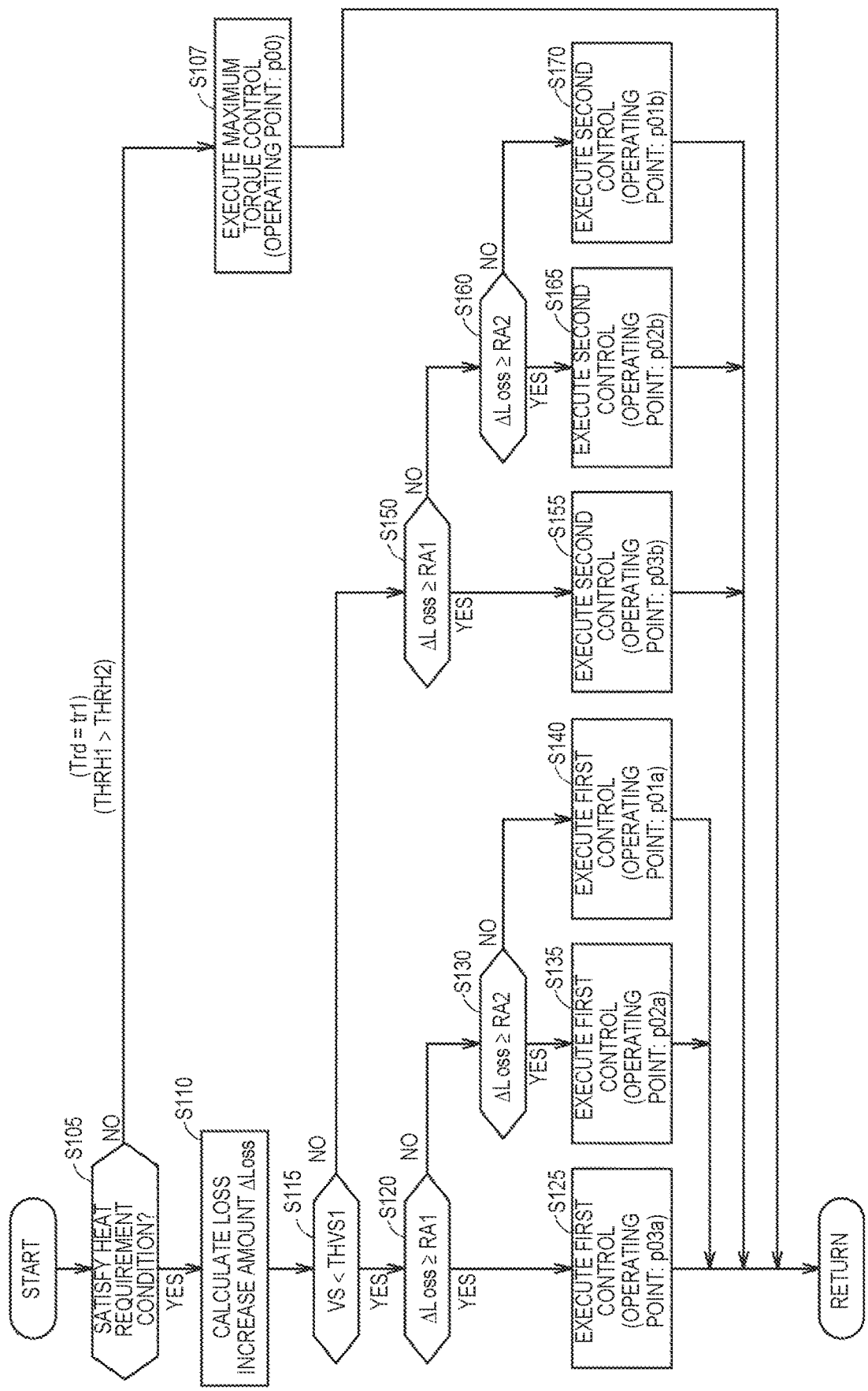
FIG. 10 is a flowchart illustrating processes executed by the ECU.

FIG. 10 is a flowchart illustrating processes executed by the ECU 100. It is assumed that at the start of this flowchart, the ECU 500 is executing maximum torque control. For ease of description, it is assumed that the torque command value TRd is tr1 and the threshold speed THVS1 is equal to the threshold speed THVS2. In the following description, step will be abbreviated as "S" and FIG. 6 will be referred to as appropriate.

Referring to FIG. 10, the ECU 100 determines whether a heat requirement condition is satisfied (S105). When this condition is not satisfied (NO in S105), the ECU 100 executes the maximum torque control (S107). In this case, the operating point in the TR-β characteristic diagram is p00. After S107, the process moves to return. When the heat requirement condition is satisfied (YES in S105), the ECU 100 calculates a loss increase amount ΔLoss (S110). The loss increase amount ΔLoss is the difference between the required heat amount RH and the heat generation amount MHV. After S110, the process proceeds to S115.

The ECU 100 determines whether the vehicle speed VS is less than the threshold speed THVS1 (S115). When the vehicle speed VS is equal to or higher than the threshold speed THVS1 (NO in S115), the process proceeds to S150. When the vehicle speed VS is less than the threshold speed THVS1 (YES in S115), the process proceeds to S120.

The ECU 100 determines whether the loss increase amount ΔLoss is equal to or greater than a reference amount RA1 (S120). When the loss increase amount ΔLoss is equal to or greater than the reference amount RA1 (YES in S120), the ECU 100 executes the first control so that the operating point becomes p03a (S125). When the loss increase amount ΔLoss is less than the reference amount RA1 (NO in S120), the process proceeds to S130.

The ECU 100 determines whether the loss increase amount ΔLoss is equal to or greater than a reference amount RA2 (S130). The reference amount RA2 is less than the reference amount RA1. When the loss increase amount ΔLoss is equal to or greater than the reference amount RA2 (YES in S130), the ECU 100 executes the first control so that the operating point becomes p02a (S135). When the loss increase amount ΔLoss is less than the reference amount RA2 (NO in S130), the ECU 100 executes the first control so that the operating point becomes p01a (S140). After S125, S135, or S140, the process moves to return.

The ECU 100 determines whether the loss increase amount ΔLoss is equal to or greater than the reference amount RA1 (S150). When the loss increase amount ΔLoss is equal to or greater than the reference amount RA1 (YES in S150), the ECU 100 executes the second control so that the operating point becomes p03b (S155). When the loss increase amount ΔLoss is less than the reference amount RA1 (NO in S150), the process proceeds to S160.

The ECU 100 determines whether the loss increase amount ΔLoss is equal to or greater than the reference amount RA2 (S160). When the loss increase amount ΔLoss is equal to or greater than the reference amount RA2 (YES in S160), the ECU 100 executes the second control so that the operating point becomes p02b (S165). When the loss increase amount ΔLoss is less than the reference amount RA2 (NO in S160), the ECU 100 executes the second control so that the operating point becomes p01b (S170). After S155, S165, or S170, the process moves to return.

As described above, according to the embodiment, in the loss increase control, the ECU 100 controls the inverter 20 so that the d-axis current Id becomes larger than Id0 when the vehicle speed VS is less than the threshold speed THVS1. Thereby, when the vehicle 1 is traveling at low speed or stopped, the power storage device B can be heated using the heat from the motor M while avoiding a situation where the comfort in the vehicle cabin is impaired.

First Modification Example of Embodiment

Figure 11:
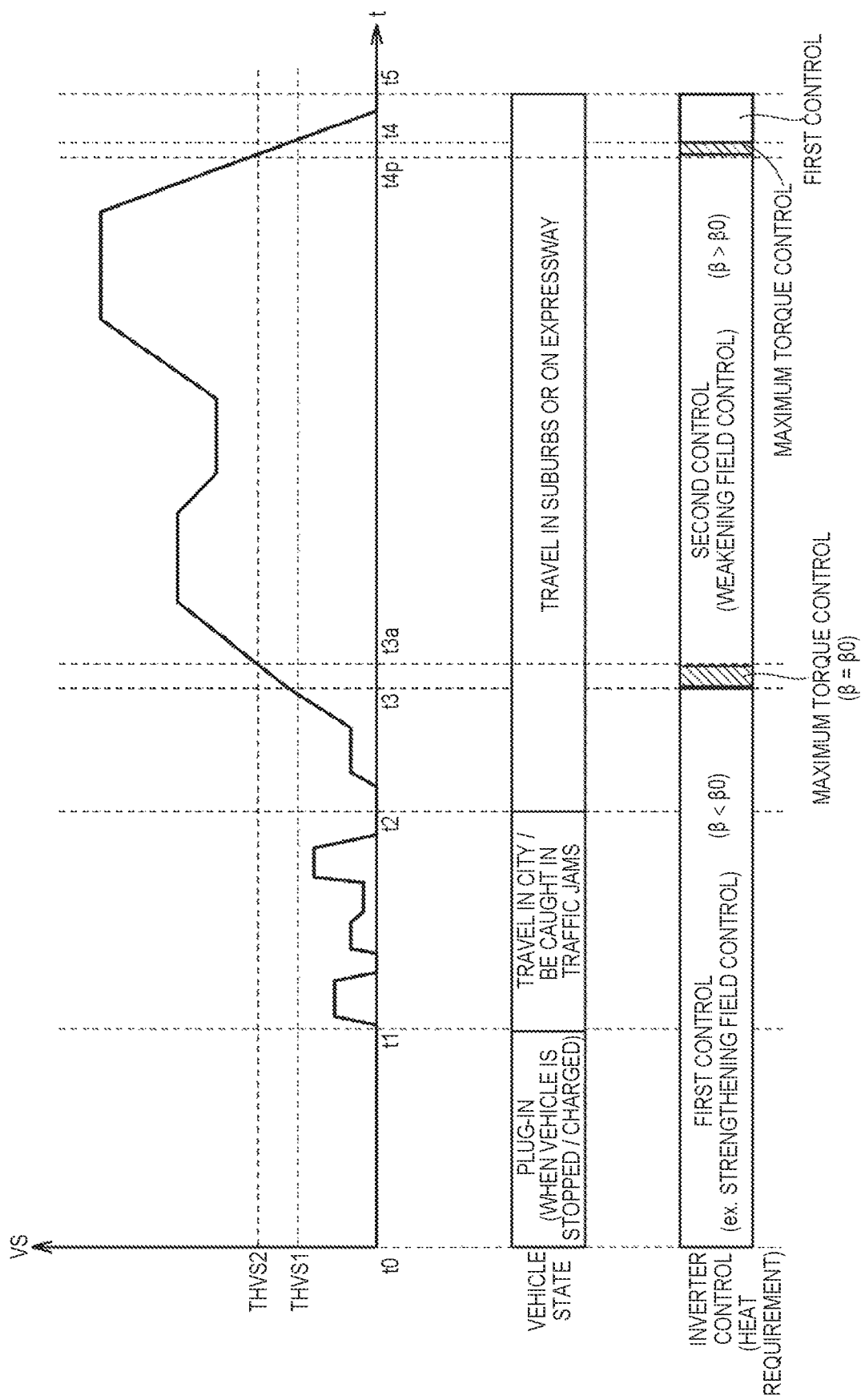
FIG. 11 is a diagram for illustrating another example of the transition of the inverter control by the ECU.

FIG. 11 is a diagram for illustrating another example of the transition of inverter control by the ECU 100. Referring to FIG. 11, in this example, the threshold speed THVS2 is higher than the threshold speed THVS1. Time t3a is the time when the vehicle speed VS exceeds the threshold speed THVS2. Time t4p is the time when the vehicle speed VS falls below the threshold speed THVS2. In other respects, FIG. 11 is similar to FIG. 10.

The ECU 100 executes maximum torque control when the vehicle speed VS is equal to or higher than the threshold speed THVS1 and lower than the threshold speed THVS2 (during the period from time t3 to time t3a and during the period from time t4p to time t4).

For example, the ECU 100 switches the first control to the maximum torque control at time t3, and switches the maximum torque control to the second control at time t4. Similarly, the ECU 100 switches the second control to the maximum torque control at time t4p, and switches the maximum torque control to the first control at time t4. In this way, by switching the inverter control from the first control to the second control via the maximum torque control (or vice versa), the control state (current vector Ivec) of the motor M can be gradually changed (see FIG. 4).

Second Modification Example of Embodiment

Referring again to FIG. 1, the ECU 100 is configured to be able to execute the first control also during external charging control. In this case, the ECU 100 may control the charging power from the charging equipment 2 to the power storage device B depending on whether the heat requirement condition is satisfied.

Specifically, the ECU 100 controls charging power to the first charging power when the heat requirement condition is not satisfied during the external charging control. On the other hand, when the heat requirement condition is satisfied during the external charging control (for example, when executing the first control), the ECU 100 controls the charging power to be the second charging power, which is larger than the first charging power.

Since the inverter 20 operates using the power of the power storage device B, the first control may increase the power consumption of the power storage device B. When the first control is executed during charging and the charging power is controlled to be the first charging power, due to the increased power consumption of the power storage device B, the charging time of the power storage device B may be prolonged. When the charging power is controlled to be the second charging power during the external charging control, the charging power increases compared to the case where the charging power is controlled to the first charging power. Thereby, the increase in power consumption of the power storage device B during the first control can be offset by the increase in charging power. Therefore, when the power storage device B is heated using heat generated from the motor M during the external charging control, it is possible to avoid a situation where the charging time is prolonged.

Third Modification Example of Embodiment

In this third modification example, a heating target in vehicle 1 is the air in the cabin of the vehicle 1. In this case, the heat requirement condition is, for example, that a user requests heating (heating of the vehicle cabin) of the air in the vehicle cabin using the HMI device 57.

For example, the ECU 100 calculates the required heat amount RH according to the target temperature of the air in the vehicle cabin, the temperature TC, TM, and the specific heat of the heat medium. This target temperature is set by the user using the HMI device 57.

Figure 12:
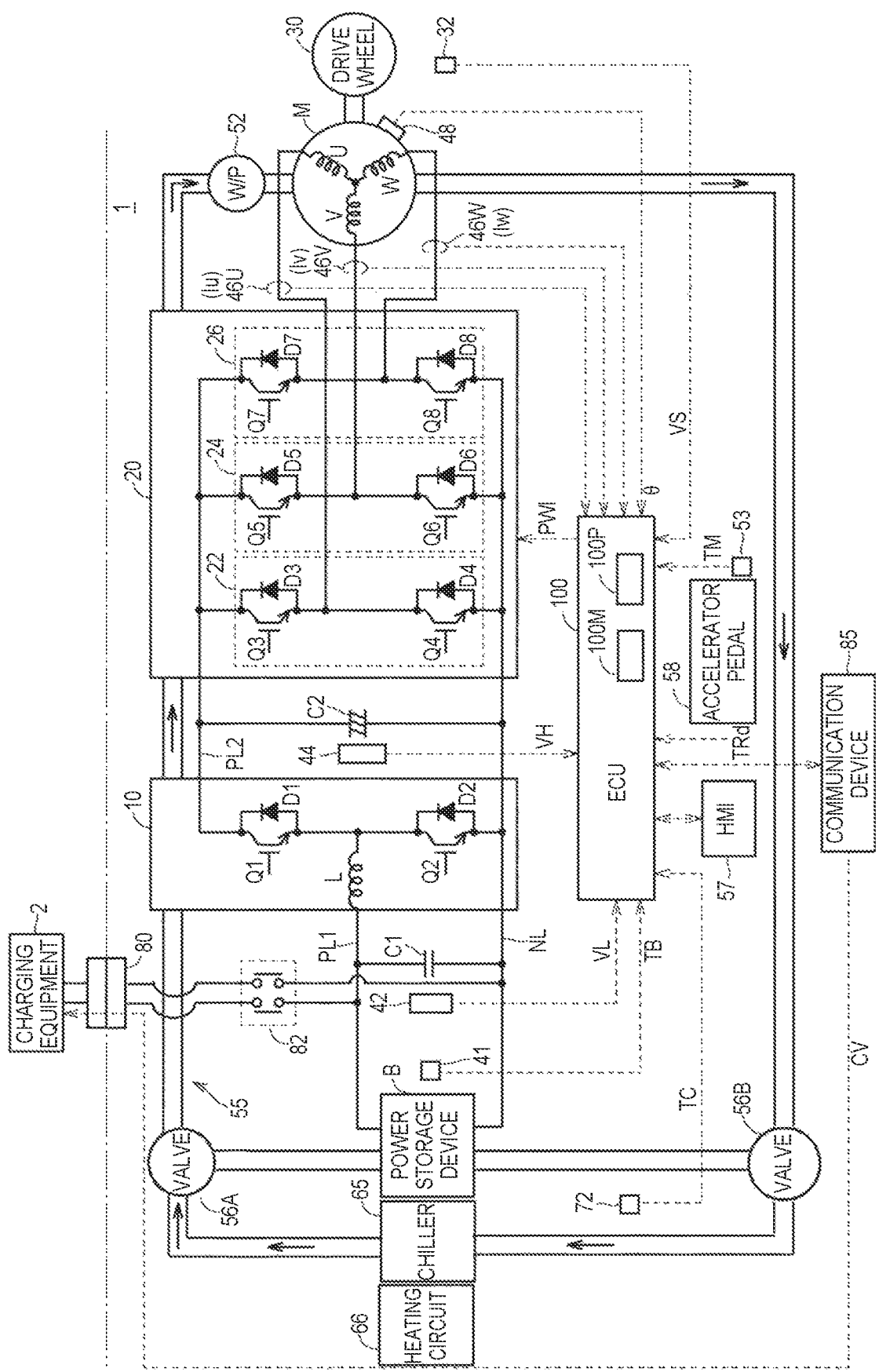
FIG. 12 is a diagram illustrating how heat generated from the motor is used to heat a vehicle cabin.

FIG. 12 is a diagram illustrating how heat generated from the motor M is used to heat the vehicle cabin. In this example, heating starts in response to the heating request operation.

Referring to FIG. 12, the ECU 100 controls the switching valves 56A, 56B so that the heat medium exchanges heat with the chiller 65 in response to the heating request operation. Thereby, the heat stored in the heat medium due to the heat generated by the motor M is transmitted to the heating circuit 66 via the chiller 65. As a result, the heat generated by the motor M can be used to heat the vehicle cabin.

Other Modification Examples

In the embodiment, the index value regarding the rotation speed of the motor M is assumed to be the vehicle speed VS, but the index value may be the rotation speed N. In this case, the threshold rotation speed THN1 corresponds to an example of the "first threshold" of the present disclosure, and the threshold rotation speed (rotation speed N corresponding to the threshold speed THVS2) higher than the threshold rotation speed THN1 corresponds to an example of the "second threshold" of the present disclosure.

In the embodiment, the vehicle 1 includes the converter 10, but the converter 10 may be omitted.

Although in the embodiment, the vehicle 1 is assumed to be an EV, it may be replaced by other kinds of electrified vehicles such as a hybrid vehicle (hybrid electric vehicle: HEV) further equipped with an engine or a fuel cell vehicle (fuel cell electric vehicle: FCEV).

The embodiments disclosed this time should be considered to be illustrative in all respects and not restrictive. The scope of the present disclosure is indicated by the claims rather than the above description, and it is intended that all changes within the meaning and range equivalent to the claims are included.

What is claimed is:

1. An electrified vehicle comprising:
a drive device including an alternating current motor that generates a driving force used to allow the electrified vehicle to travel, and an inverter that drives the alternating current motor;
a control device that controls the drive device; and
a heat transfer device that transfers heat generated due to power loss in the drive device to a heating target in the electrified vehicle,
wherein when a predetermined heat requirement condition designed to request an increase in the heat transferred to the heating target is satisfied, the control device executes loss increase control to control the drive device so that the power loss increases compared to a case where the heat requirement condition is not satisfied, and
wherein when an index value regarding a rotation speed of the alternating current motor is less than a first threshold, the loss increase control includes first control to make a d-axis current of the alternating current motor larger than a reference d-axis current, the reference d-axis current being the d-axis current when the heat requirement condition is not satisfied.

2. The electrified vehicle according to claim 1, wherein the first control includes controlling the inverter so as to increase a current amplitude of the alternating current motor and delay a current advance angle of the alternating current motor compared to before the heat requirement condition is satisfied.

3. The electrified vehicle according to claim 2, wherein when the heat requirement condition is not satisfied, the control device sets the current advance angle so as to maximize torque of the alternating current motor for a same current amplitude.

4. The electrified vehicle according to claim 1, wherein the first control includes controlling the inverter so that torque of the alternating current motor (M) is maintained before and after the heat requirement condition is satisfied.

5. The electrified vehicle according to claim 1, wherein the first control includes controlling the inverter so that the d-axis current becomes positive.

6. The electrified vehicle according to claim 1, wherein the first control includes controlling the inverter so that when the electrified vehicle is stopped, only the d-axis current flows in the alternating current motor among a q-axis current and the d-axis current of the alternating current motor.

7. The electrified vehicle according to claim 1, wherein the first control includes controlling the inverter so as to increase line voltage of the alternating current motor compared to before the heat requirement condition is satisfied.

8. The electrified vehicle according to claim 1, wherein the loss increase control further includes second control that makes the d-axis current smaller than the reference d-axis current when the index value is equal to or greater than a second threshold, the second threshold being equal to or greater than the first threshold.

9. The electrified vehicle according to claim 8, wherein the second control includes controlling the inverter so as to increase a current amplitude of the alternating current motor and advance a current advance angle of the alternating current motor compared to before the heat requirement condition is satisfied.

10. The electrified vehicle according to claim 8, wherein volume generated from the alternating current motor during the second control is greater than volume generated from the alternating current motor during the first control.

11. The electrified vehicle according to claim 1, wherein the index value includes a value indicating a traveling speed of the electrified vehicle.

12. The electrified vehicle according to claim 1, wherein the index value includes a value indicating the rotation speed.

13. The electrified vehicle according to claim 1, further comprising a temperature sensor that measures a temperature of the heating target,
wherein the heat requirement condition is that the power loss is less than a required loss amount of the drive device, and
wherein the required loss amount is determined according to the temperature of the heating target and a target temperature of the heating target.

14. The electrified vehicle according to claim 1, further comprising a power storage device that stores power used to allow the electrified vehicle to travel,
wherein the heating target is the power storage device, and
wherein the heat requirement condition includes that a temperature of the power storage device is below a threshold temperature.

15. The electrified vehicle according to claim 1,
wherein the heating target is air in a vehicle cabin of the electrified vehicle, and
wherein the heat requirement condition includes that heating of the air is requested.

16. The electrified vehicle according to claim 1, further comprising a power storage device that stores operating power of the drive device,
wherein the power storage device is charged by charging power from charging equipment external to the electrified vehicle,
wherein the control device is further configured to control the charging power, and
wherein the control device:
controls the charging power to be a first charging power when the heat requirement condition is not satisfied during charging of the power storage device; and
controls the charging power to be a second charging power that is larger than the first charging power when executing the first control during the charging.

* * * * *